United States Patent
Stockberger et al.

(10) Patent No.: US 7,336,049 B2
(45) Date of Patent: Feb. 26, 2008

(54) METHOD AND APPARATUS FOR ADAPTIVE MOTOR SPEED CONTROL

(75) Inventors: Randall Lee Stockberger, Independence, OR (US); Ronald Gregory Paul, Corvallis, OR (US); Todd Allen McClelland, Corvallis, OR (US); Gregory Frank Carlson, Corvallis, OR (US)

(73) Assignee: Marvell International Technologies Ltd. (BM)

( * ) Notice: Subject to any disclaimer, the term of this patent is extended or adjusted under 35 U.S.C. 154(b) by 0 days.

(21) Appl. No.: 11/700,518

(22) Filed: Jan. 31, 2007

(65) Prior Publication Data

US 2007/0126388 A1 Jun. 7, 2007

(51) Int. Cl.
*G05B 11/36* (2006.01)
(52) U.S. Cl. .................................................. 318/609
(58) Field of Classification Search .................. None
See application file for complete search history.

(56) References Cited

U.S. PATENT DOCUMENTS

| 5,467,173 | A | 11/1995 | Sakata et al. |
| 5,757,149 | A | 5/1998 | Sato et al. |
| 6,719,396 | B2 | 4/2004 | Anzai |
| 2003/0067507 | A1 | 4/2003 | Anzai |
| 2004/0068359 | A1 | 4/2004 | Neiss et al. |
| 2004/0135534 | A1 | 7/2004 | Cullen |
| 2005/0225279 | A1 | 10/2005 | Hatada |

*Primary Examiner*—Lincoln Donovan
*Assistant Examiner*—Erick Glass

(57) ABSTRACT

A different adaptive control method is used to control a motor during each of two or more phases of motor operation. Thus, in a first phase of motor operation the motor is controlled using a first adaptive control method, in a second phase of motor operation the motor is controlled using a second adaptive control method, and so forth. The motor can be controlled in this manner in any number of phases, in which the motor is used for any of a number of corresponding purposes. The method used in each phase can be optimized to suit that type of operation without compromising operation during other phases.

26 Claims, 5 Drawing Sheets

METHOD AND APPARATUS FOR ADAPTIVE MOTOR SPEED CONTROL

DESCRIPTION OF THE RELATED ART

Electronic devices such as computer printers commonly include small motors that need to be precisely controlled. For example, it is important that the motor that moves the printhead carriage in an inkjet printer move at a precisely maintained constant speed across the paper. A similar requirement exists for the motor that advances the paper. Various methods have been used to control such motors. One such method involves the proportional-integral-derivative (PID) algorithm.

PID is a well-known type of adaptive control algorithm that has long been used for controlling motors, heating and cooling processes, and many other diverse applications. In the lexicon of adaptive control, the system being controlled is referred to generically as a "plant." Generally speaking, the PID algorithm includes steps of measuring the deviation or error between the current plant output value or present value (e.g., motor speed) and the target plant output value or setpoint, calculating a proportional error term, calculating an error integral term (i.e., the error over time), calculating an error derivative term, applying a separate gain factor to each term, and summing the results to create the final value. Finally, the result is fed back to the plant as an input or, in the lexicon of adaptive control, an excitation or stimulus. The PID algorithm works well for controlling systems in which the objective is to move the system toward a setpoint, such as a constant motor speed.

One advantage of the PID algorithm over other adaptive control algorithms is its flexibility. The algorithm can be tuned to better suit it for a given application. For example, in a motor speed controller, the algorithm can be tuned to optimize steady-state performance, i.e., to precisely maintain speed.

In some types of devices, the same motor may be operated in different phases or be used for multiple purposes. For example, in an inkjet printer, it is desirable for the motor to accelerate the printhead carriage in what can be considered a first phase of motor operation so that the carriage is moving at a target speed by the time it reaches the beginning of the printable area of the page. The motor continues to move the carriage across the page at the target speed in a second phase of operation, and then decelerates the carriage in a third phase of operation when it reaches the end of the printable area. It is desirable for the printhead to accelerate to its target speed and decelerate from its target speed as quickly as possible because the physical distance the carriage can travel during the acceleration and deceleration phases is limited by the overall width of the printer, which is optimally not very much wider than a sheet of the paper to be printed. The PID algorithm can be tuned to optimize the steady-state or constant-speed phase, or it can be tuned to optimized the acceleration and deceleration phases, but it cannot readily be tuned to optimize all three phases of operation. For example, if the algorithm is tuned to optimize the constant-speed phase, then during the acceleration phase it may cause the carriage to either overshoot the target constant speed or to approach the constant speed in an overly conservative manner, neither of which is optimal. If the algorithm is tuned to optimize the acceleration and deceleration phases, constant-speed performance may suffer.

The present invention addresses the above-described problems and deficiencies and others in the manner described below.

SUMMARY OF THE INVENTION

The present invention relates to a method and system for controlling a motor using a different adaptive control method during each of a plurality of phases of operation. Thus, in a first phase of motor operation the motor is controlled using a first adaptive control method, and in a second phase of motor operation the motor is controlled using a second adaptive control method. The motor can be controlled in this manner in any number of phases, in which the motor is used for any of a number of corresponding purposes. For example, in an illustrative embodiment of the invention there are three phases: an acceleration phase in which a first adaptive control method causes the motor to accelerate toward a target speed, a constant-speed phase in which a second adaptive control method causes the motor to maintain the target speed, and a deceleration phase in which an adaptive control method causes the motor to decelerate from the target speed. The adaptive control method used in the deceleration phase can be the same as that used in the acceleration phase or, alternatively in other embodiments of the invention, it can be still a third method.

The first, second, etc., adaptive control methods can be of any suitable type known in the art. As in any conventional adaptive control method, the value being controlled, which is motor speed in the case of the present invention, is measured and fed back as an input to the method. Performing the method using motor speed as feedback yields a control value. An excitation signal is applied to the motor that represents the control value. For example, for motors of the type that operate at a speed dependent upon the power applied to them, the signal will provide an amount of power in the motor that represents the control value. Proportional-integral-derivative (PID) methods represent an example of such an adaptive control method. Other adaptive control methods include those that use look-up tables. Still others will occur to persons skilled in the art in view of the teachings herein (i.e., in this patent specification).

In an exemplary look-up table-based adaptive control method, the table relates the control values to measured motor speed. In some such embodiments of the invention, the method can use a different look-up table for different phases of operation, while in other embodiments the same table can be used for more than one phase of operation. The methods can be performed by (and any look-up tables, data or other elements used in the method can be stored in) suitable logic, such as a programmed microprocessor, microcontroller, or other integrated circuit or portion thereof.

The invention optimizes motor performance in each of several phases of operation without sacrificing performance in the other phases. By using a different adaptive control method during each of a plurality of phases of operation, each adaptive control method can be tuned or otherwise optimized to suit that phase of operation. For example, the method used during an acceleration phase can be optimized to accelerate the motor as quickly as possible to the target speed without overshooting it, while the method using during a constant-speed phase can be optimized to maintain the motor at the target speed without compromising acceleration or deceleration phases.

DETAILED DESCRIPTION OF PREFERRED EMBODIMENTS

Figure 1:
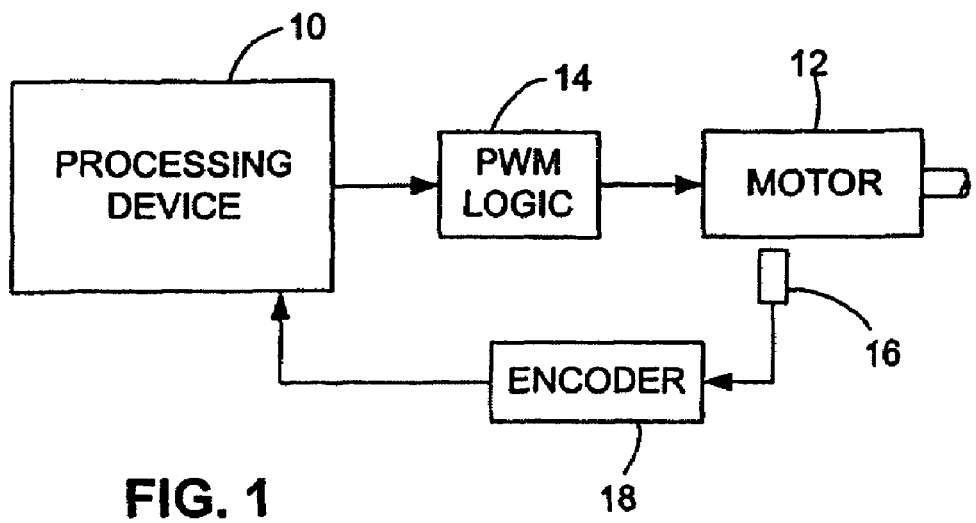
FIG. 1 is a schematic block diagram of an exemplary processor-based motor control system in accordance with one embodiment of the invention.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention.

As illustrated in FIG. 1, a system based upon a microprocessor, microcontroller or similar processing device 10 controls a motor 12. Motor 12 can be of any suitable type in which motor speed can be controlled by controlling the power, current or similar parameter of the input signal applied to it. In the illustrated embodiment of the invention, motor 12 is of a type that is commonly used in small electronic machines and devices, such as computer inkjet printers. In such embodiments, processing device 10 can be included in the processing logic of an application-specific integrated circuit (ASIC) or other circuitry that is used to control other aspects of the printer or other device. Motor 12 can be powered through pulse-width modulation (PWM) logic 14 as is common in devices having motors of this type or through any other suitable motor powering system known in the art.

Processing device 10 effects adaptive control methods or algorithms, as described in further detail below. As in a conventional adaptively-controlled motor system, a suitable encoder 18 reads the speed of motor 12 as measured by a suitable sensor 16, such as an optical encoder, and feeds back the motor speed value back to processing device 10. Processing device 10 provides the feedback to an adaptive control method as an input, which generates a result or output in response. Processing device 10 provides this result or control value to PWM logic 14, which in turn provides an input signal to motor 12 in response. The control value indicates the power that PWM logic 14 provides to motor 12. As persons skilled in the art to which the invention relates can appreciate, these steps occur repetitively at a sufficiently high rate such that processing device 10 effectively outputs a stream of control values so as to control motor 12 substantially continuously during operation of the printer.

In the illustrated embodiment of the invention, motor 12 moves the printhead carriage in an inkjet printer (not shown) across the page to be printed. Motor 12 operates in three consecutive phases: an acceleration phase in which motor 12 accelerates the printhead from a speed of zero at one extreme of the printhead range of travel to a predetermined target speed; a constant-speed phase in which it maintains the target speed as the printhead moves across the printable area of the page; and a deceleration phase in which it decelerates the printhead from the target speed to a speed of zero at the other extreme of the printhead range of travel. Although not directly related to the present invention, following the deceleration phase, motor 12 reverses direction and moves the printhead carriage in the opposite direction across the page.

Figure 2:
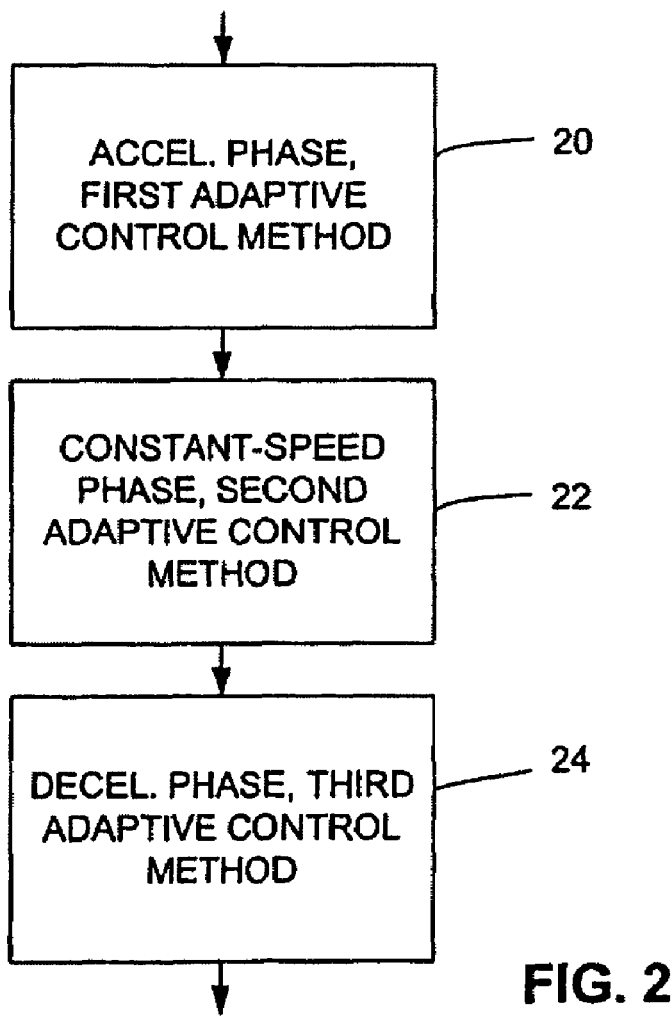
FIG. 2 is a flow diagram illustrating an exemplary method for controlling a motor during three phases of operation in the system illustrated in FIG. 1.

Processing device 10 is suitably programmed or adapted to effect the method represented by the steps illustrated in FIG. 2. At indicated by step 20, a first adaptive control method or algorithm is used to control motor 12 during the first phase, the acceleration phase, described in further detail below. As indicated by step 22, after the acceleration phase, when the motor (and thus the printhead carriage that the motor moves) is at the target speed, a second adaptive control method or algorithm is used to control motor 12 during the second phase, the constant-speed phase, described in further detail below. As indicated by step 24, after the constant-speed phase, when the printhead carriage has traveled a predetermined distance or reached a predetermined point, an adaptive control method or algorithm is used to control motor 12 during the third phase, the deceleration phase, described in further detail below. The method used in step 24 can be the same as one of the methods used in steps 20 and 22, i.e., the first and second methods, or can be yet a third method. Generally speaking, any combination of two or more different adaptive control methods can be used in the three phases.

Figure 3:
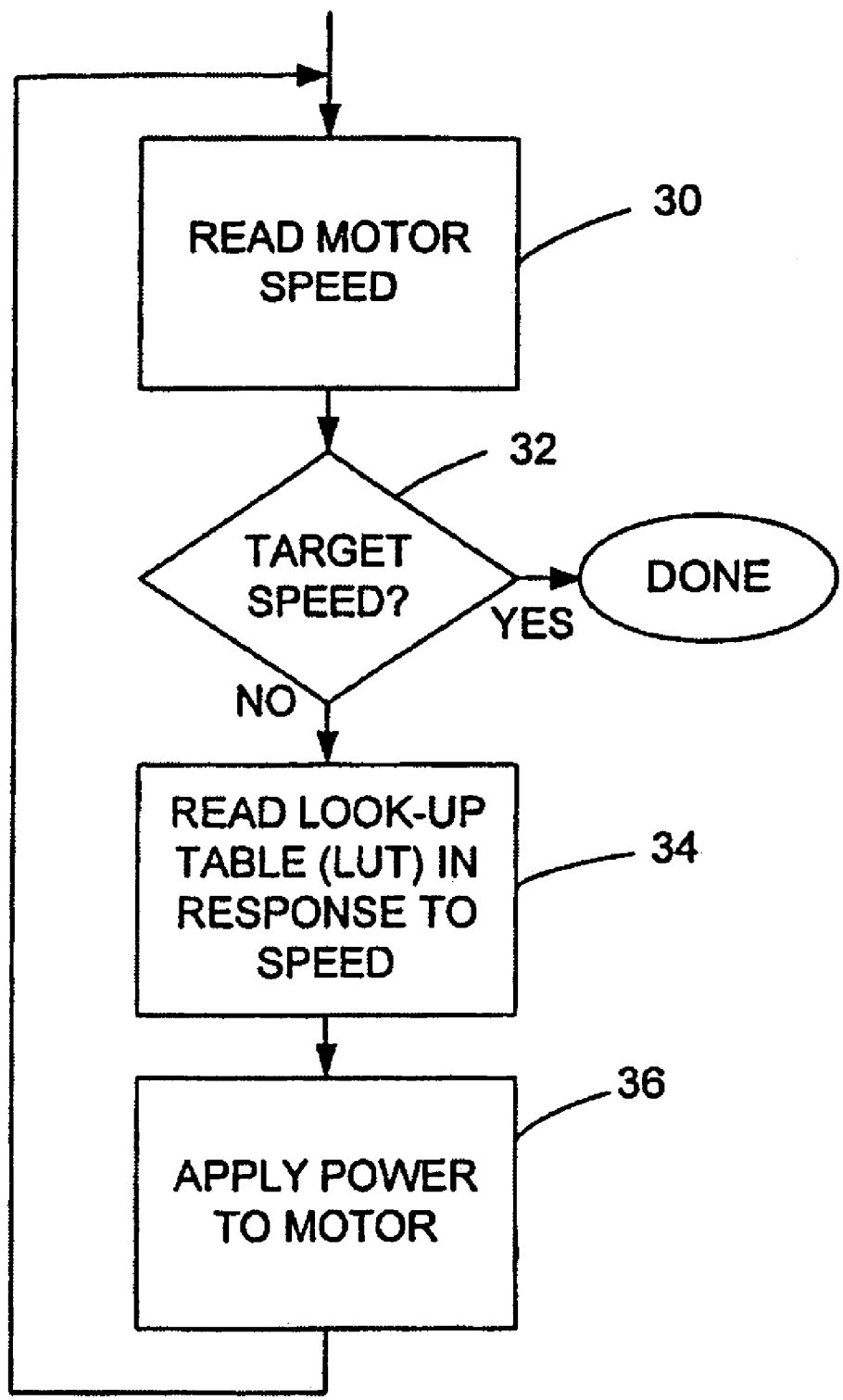
FIG. 3 is a flow diagram illustrating an exemplary method for controlling a motor acceleration phase in the system illustrated in FIG. 1.

Step 20 of FIG. 2 (the acceleration phase) is illustrated in further detail in FIG. 3. At step 30, the motor speed is read, and at step 32 it is determined whether the motor speed has reached the predetermined target speed. If the motor is at the target speed, then step 20 has completed, and the method continues to step 22 as described above. However, if the motor speed has not yet accelerated to the target speed, then at step 34 a look-up table-based method is used to determine how to change the signal applied to motor 12 to adjust its speed.

Figure 4:
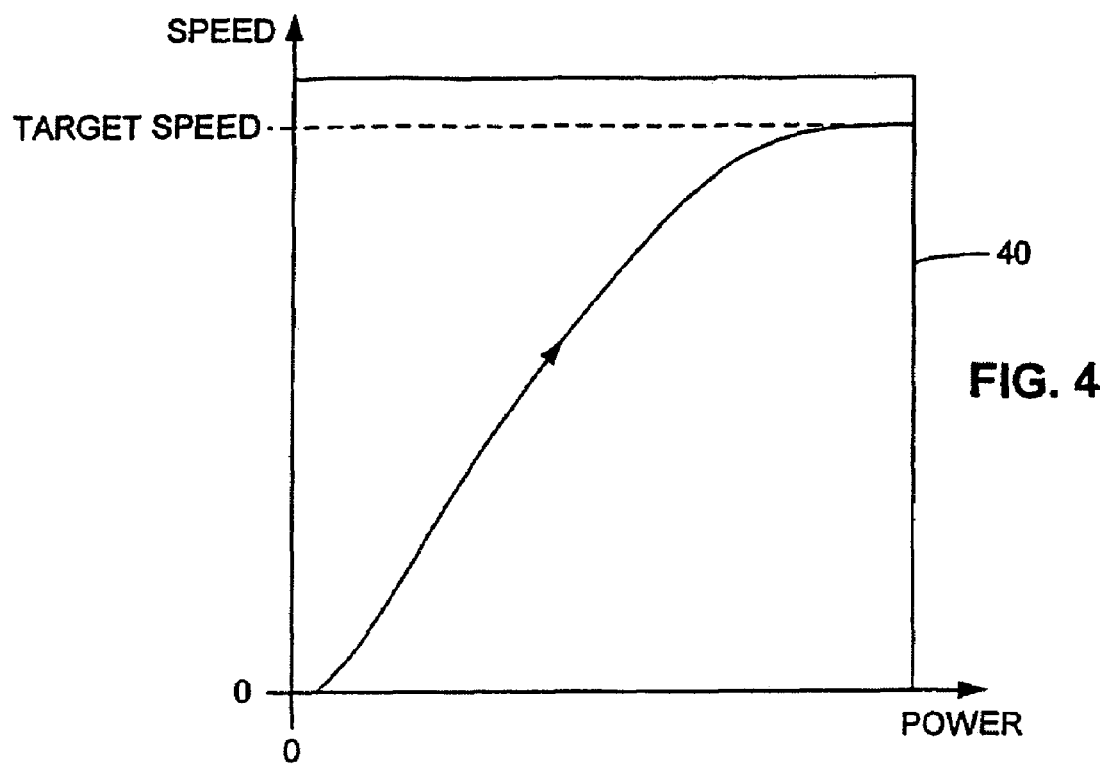
FIG. 4 illustrates in generalized form an acceleration look-up table for the method illustrated in the flow diagram of FIG. 2.

Referring briefly to FIG. 4, an acceleration look-up table 40 is illustrated in generalized form, relating motor input power to motor speed. Look-up table 40 can be created by, for example, empirical measurement and stored or otherwise included in the logic along with the algorithms prior to the time that the printer is manufactured. That is, a known amount of power can be applied to motor 12 (or a motor essentially identical to motor 12 but used for gathering the look-up table data in a laboratory or manufacturing setting rather than in a commercial embodiment of the printer product itself), and the resulting speed can be measured and recorded along with the corresponding power that was applied. This process can be repeated many times, each time increasing the power that is applied, until the resulting speed reaches the target speed. The resulting acceleration curve (a generalized depiction of which is shown in FIG. 4) can then be used to power motor 12 by having a suitable computer or other controller (not shown) read the power values in succession and apply them to the motor at a predetermined rate (e.g., via PWM logic or similar motor powering system).

Increasing the speed too rapidly may result in the speed overshooting the target speed. Therefore, the power values in the table that approach the value at which the speed is the target speed may need to be adjusted so as to cause the motor to more gradually approach the target speed and not overshoot it. By optimizing the acceleration curve represented by table 40 in this manner, the motor can reach the target speed as quickly as possible without overshooting it. Note that instead of using look-up table 40, in other embodiments of the invention the adaptive control method could use a mathematical formula substantially equivalent to the acceleration curve represented by table 40. Still other means for providing such adaptive control logic will occur readily to persons skilled in the art in view of the teachings herein.

Returning to FIG. 3, at step 34 the measured motor speed is used as an input to look-up table 40, and the corresponding control value, which represents or is indicative of power, is obtained from look-up table 40 as an output. At step 36, the control value is applied to motor 12 via PWM logic 14 (see FIG. 1) as described above. The process repeats, beginning at step 30, until the target speed is reached.

Although in the illustrated embodiment of the invention the adaptive control method used to control motor 12 during the acceleration phase is based upon use of a look-up table, in other embodiments the method can be based upon use of a proportional-integral-derivative (PID) method or any other suitable adaptive control method known in the art. Indeed, as described below, a PID adaptive control method or algorithm is preferably used to control motor 12 during the second phase (the constant-speed phase), while in the third phase a look-up table-based method is preferably used again.

Figure 5:
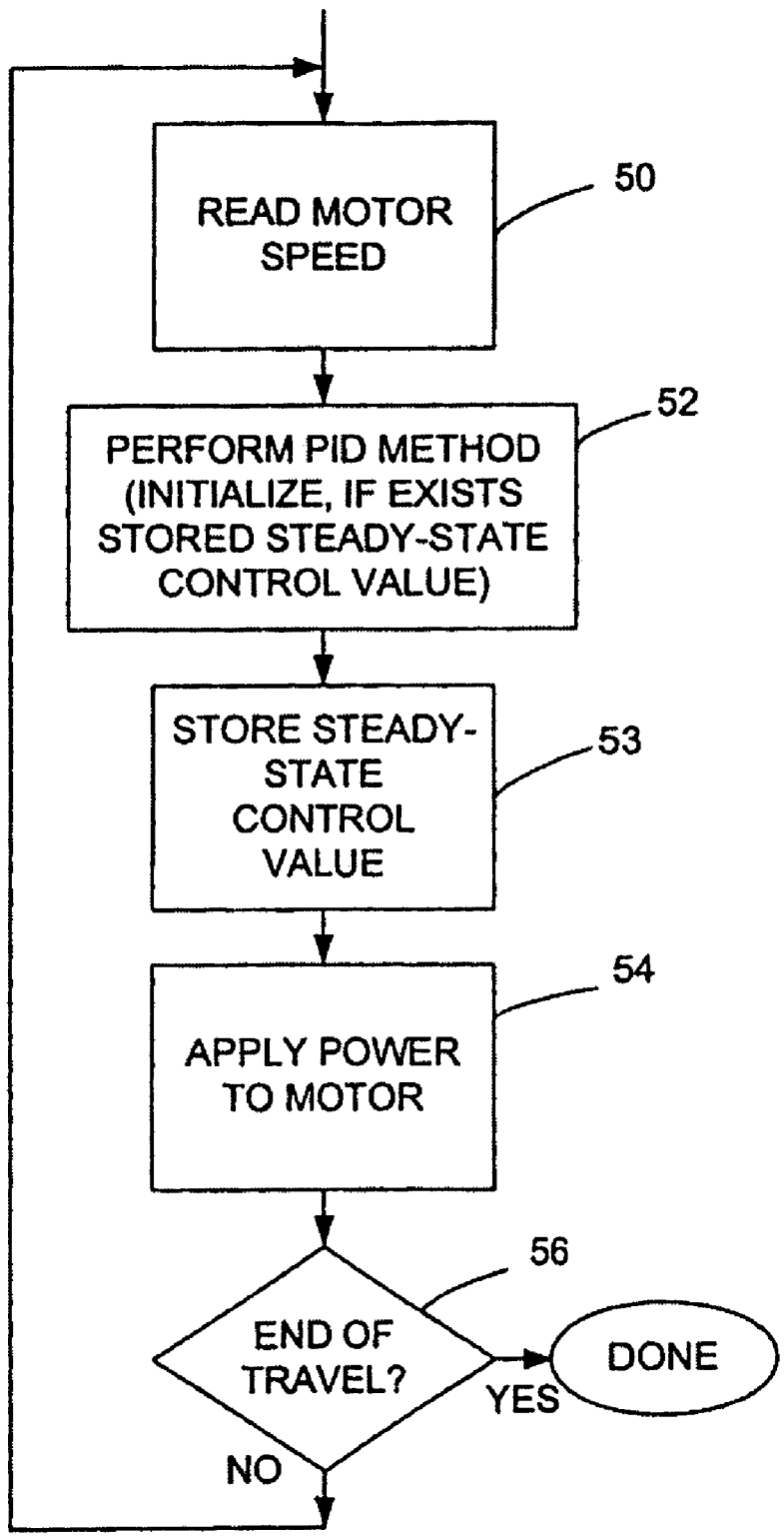
FIG. 5 is a flow diagram illustrating an exemplary method for controlling a motor constant-speed phase in the system illustrated in FIG. 1.

Step 22 (the constant-speed phase) is illustrated in further detail in FIG. 5. At step 50, the motor speed is read. At step 52 a conventional PID method is used to determine how to change the signal applied to motor 12 to adjust its speed. Suitable PID methods are well-known in the art and, indeed, have been conventionally used in printers and the like for controlling such motors. For purposes of clarity, the PID algorithm itself is not described in detail herein. It is sufficient to note that the PID method or algorithm produces a result or control value, which is applied to motor 12 at step 54 via PWM logic 14 (FIG. 1) as described above.

As known in the art, a PID algorithm causes a measured value (in this case, motor speed) to move from some initial value toward a setpoint (in this case, the target speed) and remain at the setpoint by making essentially continual adjustments to a control value (in this case, the motor power). Thus, the present method can be enhanced at step 53 by storing the value of motor power that is found to maintain the motor at the target speed, i.e., the steady-state control value. When step 52 is performed, if such a value has been previously stored (e.g., if the printhead carriage had previously traveled across the page), the stored value is retrieved and used to initialize the PID method. Step 53 is thus only performed after the motor speed reaches the steady-state target speed, and the PID method at step 52 is only initialized once, on the first iteration, if a stored value exists with which to initialize it.

As known in the art, a PID algorithm can be tuned to enhance its performance. Preferably, the PID algorithm used in step 52 is tuned to optimize its ability to precisely maintain motor 12 at a constant speed. Finally, at step 56, it is determined in the conventional manner whether the printhead carriage has traveled a predetermined distance or reached a predetermined location, indicating that it is to begin deceleration. The process repeats, beginning at step 50, until the deceleration phase is to begin.

Figure 7:
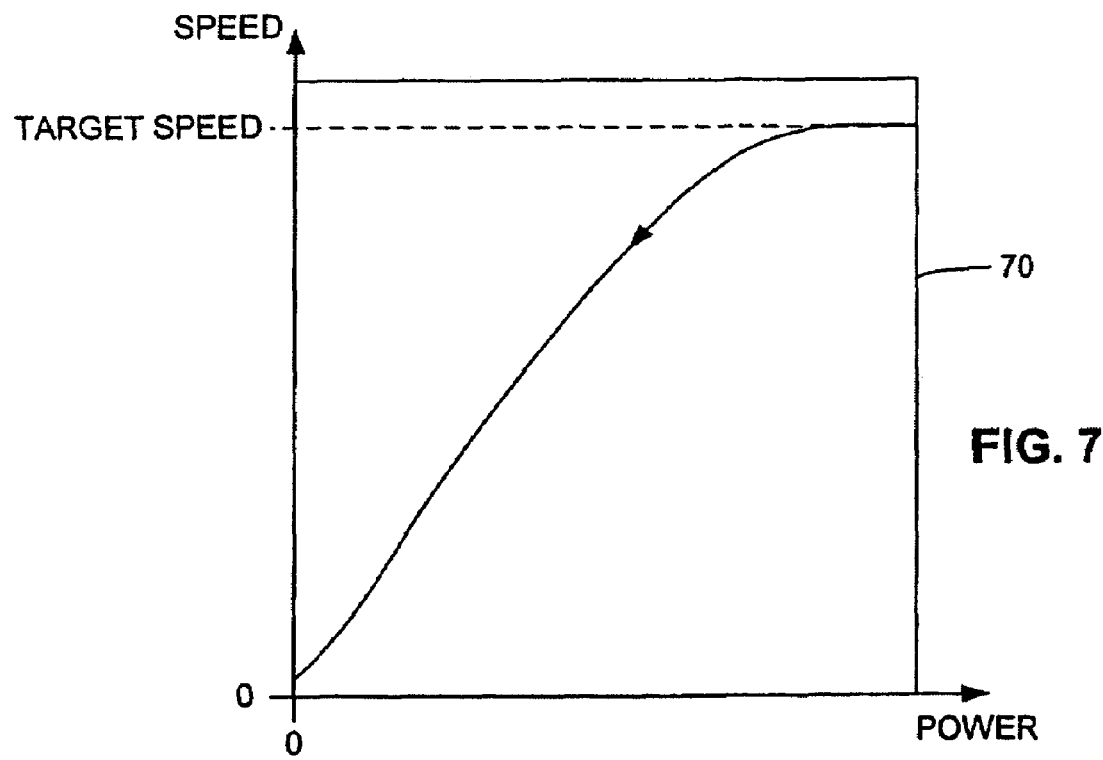
FIG. 7 illustrates in generalized form a deceleration look-up table for the method illustrated in the flow diagram of FIG. 5.
Figure 6:
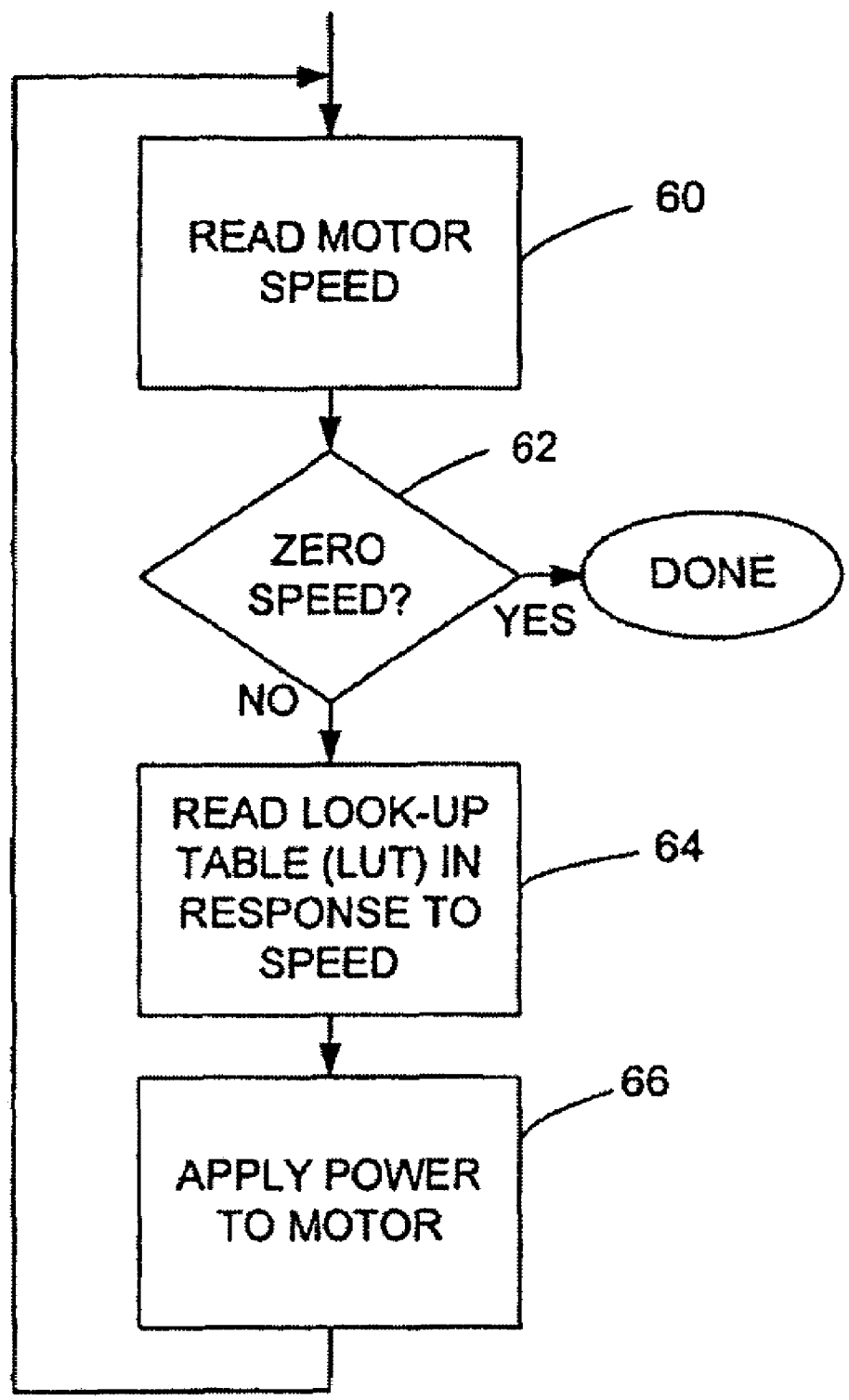
FIG. 6 is a flow diagram illustrating an exemplary method for controlling a motor deceleration phase in the system illustrated in FIG. 1.

Step 24 of FIG. 2 (the deceleration phase) is illustrated in further detail in FIG. 6. At step 60, the motor speed is read, and at step 62 it is determined whether the motor speed has decelerated to a speed of zero. If the motor has decelerated to zero, then step 24 has completed, and other printer operations can occur in the conventional manner, such as reversing the direction of motor 12 for moving the carriage back across the page. However, if the motor speed has not yet decelerated to zero, then at step 64 a look-up table-based method is used to determine how to change the signal applied to motor 12 to adjust its speed. The method used in step 64 can be essentially identical to the method described above with regard to step 34 during the acceleration phase (FIG. 3). As illustrated in FIG. 7, a similar look-up table 70 that likewise relates power to speed, optimized for deceleration, can be provided. Alternatively, in other embodiments of the invention, the same look-up table can be used in steps 34 and 64.

In the above-described exemplary embodiment of the invention, a look-up table-based adaptive control method is used for and optimized for the acceleration and deceleration phases of motor operation, while a PID method is used for and optimized for a constant-speed phase of operation that occurs between the acceleration and deceleration phases. Thus, operation in each of the three phases can be optimized without compromising operation in the other phases. In other embodiments of the invention, the method and system can operate in any number of phases using any suitable adaptive control algorithms.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for controlling a motor comprising:
   controlling the motor in response to a first adaptive control method during a first phase of motor operation, wherein the first phase is an acceleration phase, wherein controlling the motor in response to the first adaptive control method comprises measuring a first motor speed, determining a first control value using the first motor speed, and providing a first input signal to the motor based on the first control value; and
   controlling the motor in response to a second adaptive control method during a second phase of motor operation, wherein controlling the motor in response to the second adaptive control method comprises measuring a second motor speed, determining a second control value using the second motor speed, and providing a second input signal to the motor based on the second control value.

2. The method of claim 1, wherein the second phase is a constant-speed phase.

3. The method of claim 1, wherein the second phase is a deceleration phase.

4. The method of claim 1, wherein:
   the second phase is a constant-speed phase and occurs after the first phase; and
   the method further comprises:
      detecting when the motor reaches a target speed during the first phase; and
      controlling the motor in response to an adaptive control method other than the second adaptive control method during a deceleration phase of motor operation occurring after the second phase.

5. The method of claim 4, wherein the adaptive control method other than the second adaptive control method is the first adaptive control method.

6. The method of claim 5, wherein the second adaptive control method comprises a proportional-integral-derivative (PID) method.

7. The method of claim 6, further comprising:
storing a steady-state value produced by the PID method in the constant-speed phase, the steady-state value remaining stored while the motor operates during a subsequent deceleration phase and a subsequent acceleration phase; and
initializing a value in the PID method to the stored steady-state value when the motor returns to the constant-speed phase.

8. The method of claim 1, wherein determining the first or the second control value comprises obtaining the control value from control logic.

9. The method of claim 8, wherein the control logic comprises a look-up table.

10. A system for controlling a motor comprising:
a motor speed sensor means for measuring motor speed;
a motor power means;
first phase adaptive control means for causing the motor power means to produce a first signal in response to measured motor speed in accordance with a first adaptive control method and apply the first signal to the motor during a first phase of motor operation, wherein the first phase is an acceleration phase; and
second phase adaptive control means for causing the motor power means to produce a second signal in response to measured motor speed in accordance with a second adaptive control method and apply the second signal to the motor during a second phase of motor operation.

11. The system of claim 10, wherein the first phase adaptive control means and second phase adaptive control means are included at least partly in a programmed microprocessor.

12. The system of claim 10, wherein the second phase is a constant-speed phase.

13. The system of claim 10, wherein the second phase is a deceleration phase.

14. The system of claim 10, wherein at least one of the first phase adaptive control means and the second phase adaptive control means comprises a look-up table.

15. The system of claim 10, wherein at least one of the first phase adaptive control means and the second phase adaptive control means comprises a proportional-integral-derivative (PID) means for performing a proportional-integral-derivative (PID) method.

16. A system for controlling a motor comprising:
a motor speed sensor configured to measure motor speed;
a motor power system operable in at least a first phase and a second phases, wherein the first phase is an acceleration phase; and
a processing device in communication with the motor speed sensor and the motor power system, the processing device comprising a first adaptive control and a second adaptive control, the first and second adaptive controls adapted to receive the measured motor speed during the first and second phases respectively, and further adapted to provide a control value, based on the measured motor speed, to the motor power system during the first and second phases.

17. The system of claim 16, wherein the second phase is a constant-speed phase.

18. The system of claim 16, wherein at least one of the first and second adaptive controls comprises a look-up table.

19. The system of claim 16, wherein at least one of the first and second adaptive controls comprises a proportional-integral-derivative (PID) control.

20. The system of claim 16, wherein the motor power system is further operable in a third phase; and wherein the processing device further comprises a third adaptive control adapted to receive the measured motor speed during the third phase and provide a control value, based on the measured motor speed, to the motor power system during the third phase.

21. The system of claim 20, wherein the third phase is a deceleration phase.

22. The system of claim 20, wherein the third adaptive control comprises a look-up table.

23. The system of claim 20, wherein the third adaptive control comprises a proportional-integral-derivative (PID) control.

24. The system of claim 16, wherein one of the first and second adaptive controls comprises a look-up table and the other of the first and second adaptive controls comprises a proportional-integral-derivative (PID) control.

25. The system of claim 24, wherein the second phase is a constant-speed phase.

26. The system of claim 24, wherein the first adaptive control comprises the look-up table and the second adaptive control comprises the PID control.

* * * * *